United States Patent
Ciano et al.

(10) Patent No.: US 12,095,774 B2
(45) Date of Patent: Sep. 17, 2024

(54) CONTROL OF USAGE OF COMPUTING SERVICES BASED ON DYNAMIC GROUPING

(71) Applicant: INTERNATIONAL BUSINESS MACHINES CORPORATION, Armonk, NY (US)

(72) Inventors: Giuseppe Ciano, Rome (IT); Alessandro Donatelli, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 371 days.

(21) Appl. No.: 17/118,656

(22) Filed: Dec. 11, 2020

(65) Prior Publication Data

US 2022/0191215 A1 Jun. 16, 2022

(51) Int. Cl.
*H04L 29/06* (2006.01)
*H04L 9/40* (2022.01)

(52) U.S. Cl.
CPC .................. *H04L 63/108* (2013.01)

(58) Field of Classification Search
CPC .................................................. H04L 63/108
See application file for complete search history.

(56) References Cited

U.S. PATENT DOCUMENTS

| | | | |
|---|---|---|---|
| 9,602,546 B2 | 3/2017 | Shvarts et al. | |
| 9,633,182 B2 | 4/2017 | Scapa | |
| 10,834,135 B1* | 11/2020 | Chhabra | H04L 63/1433 |
| 11,206,313 B1* | 12/2021 | Dey | G06F 21/6218 |
| 2002/0128976 A1* | 9/2002 | O'Connor | G06Q 20/367 705/65 |
| 2005/0160434 A1 | 7/2005 | Tan | |
| 2009/0019155 A1* | 1/2009 | Krzanowski | H04L 63/102 709/225 |
| 2011/0093371 A1* | 4/2011 | Clemm | G06Q 30/04 707/E17.014 |
| 2011/0126275 A1* | 5/2011 | Anderson | H04L 63/14 726/8 |

(Continued)

FOREIGN PATENT DOCUMENTS

CA 2786611 A1 * 7/2011 ............. G06F 9/466

OTHER PUBLICATIONS

Disclosed Anonymously, "Method and system for cloud services federation", An IP.com Prior Art Database Technical Disclosure, IP.com No. IPCOM000250127D, IP.com Electronic Publication Date: Jun. 2, 2017, 4 pages.

(Continued)

*Primary Examiner* — Vance M Little
(74) *Attorney, Agent, or Firm* — Kristofer L. Haggerty

(57) ABSTRACT

A solution is proposed for controlling usage of computing services. A corresponding method comprises allocating a new usage token to a user in response to a usage entitlement thereof being insufficient to meet a usage weight of a new computing service. The usage entitlement is updated according to the new usage token and the usage weight of the new computing service, and the usage of the new computing service is enabled in response thereto. A computer program and a computer program product for performing the method are also proposed. Moreover, a system for implementing the method is proposed.

18 Claims, 8 Drawing Sheets

(56) References Cited

U.S. PATENT DOCUMENTS

| | | | |
|---|---|---|---|
| 2013/0019018 A1 | 1/2013 | Rice | |
| 2014/0006951 A1* | 1/2014 | Hunter | H04N 21/4821 |
| | | | 715/719 |
| 2014/0122217 A1* | 5/2014 | Hills | G06Q 30/0239 |
| | | | 705/14.39 |
| 2014/0337924 A1* | 11/2014 | Smith | H04L 63/10 |
| | | | 726/4 |
| 2015/0012991 A1 | 1/2015 | Cahill | |
| 2015/0039444 A1 | 2/2015 | Hardin | |
| 2015/0235191 A1* | 8/2015 | Sirota | G06Q 20/145 |
| | | | 705/40 |
| 2016/0134616 A1* | 5/2016 | Koushik | H04L 63/0428 |
| | | | 726/9 |
| 2017/0031955 A1* | 2/2017 | Kenchammana-Hosekote | |
| | | | G06F 16/10 |
| 2017/0331825 A1* | 11/2017 | Banka | G06F 21/105 |
| 2020/0026564 A1* | 1/2020 | Bahramshahry | |
| | | | G06Q 10/06316 |
| 2020/0026579 A1* | 1/2020 | Bahramshahry | G06F 9/5038 |
| 2020/0026580 A1* | 1/2020 | Bahramshahry | G06F 9/5077 |
| 2020/0380093 A1* | 12/2020 | Sugaya | G06F 21/105 |
| 2021/0036965 A1* | 2/2021 | Sato | G06N 5/04 |
| 2022/0043642 A1* | 2/2022 | Maturi | G06F 8/60 |

OTHER PUBLICATIONS https://priorart.ip.com/IPCOM/000180603, "Method and system for business-policy driven grouping of service invocations", An IP.com Prior Art Database Technical Disclosure, Original Publication Date: Mar. 12, 2009, IP.com No. IPCOM000180603D, IP.com Electronic Publication Date: Mar. 12, 2009, 3 pages.

* cited by examiner

CONTROL OF USAGE OF COMPUTING SERVICES BASED ON DYNAMIC GROUPING

BACKGROUND

The present disclosure relates to the information technology field. More specifically, this disclosure relates to controlling usage of computing services.

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

Computing environments based on (computing) services have become increasingly popular in recent years; generally speaking, the services provide computing functionalities that may be used repeatedly over time for different purposes by different users. A typical example is in cloud (computing) environments. In this case, (cloud) services are provided by cloud providers, which provision, configure and release computing resources required for their implementation upon request (with an actual implementation thereof that is completely opaque to the users). This de-coupling of the services from their implementation provides the illusion of an infinite capacity of the corresponding computing resources and improves their exploitation, especially for high-peak load conditions (by means of economies of scale); moreover, the users are now relived of the management of the computing resources implementing the services, and they may perform tasks (on a pay-per-use basis) that were not feasible previously because of their cost and complexity (especially for individuals and small companies).

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of controlling the usage of computing services according to a dynamic grouping thereof.

Particularly, an embodiment provides a method for controlling usage of computing services. The method includes allocating a new usage token to a user in response to a usage entitlement thereof being insufficient to meet a usage weight of a new computing service. The usage entitlement is updated according to the new usage token and the usage weight of the new computing service, and the usage of the new computing service is enabled in response thereto.

A further aspect provides a computer program for implementing the method.

A further aspect provides a corresponding computer program product.

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its properties, like value, content and representation).
Particularly.

DETAILED DESCRIPTION

Figure 1A:
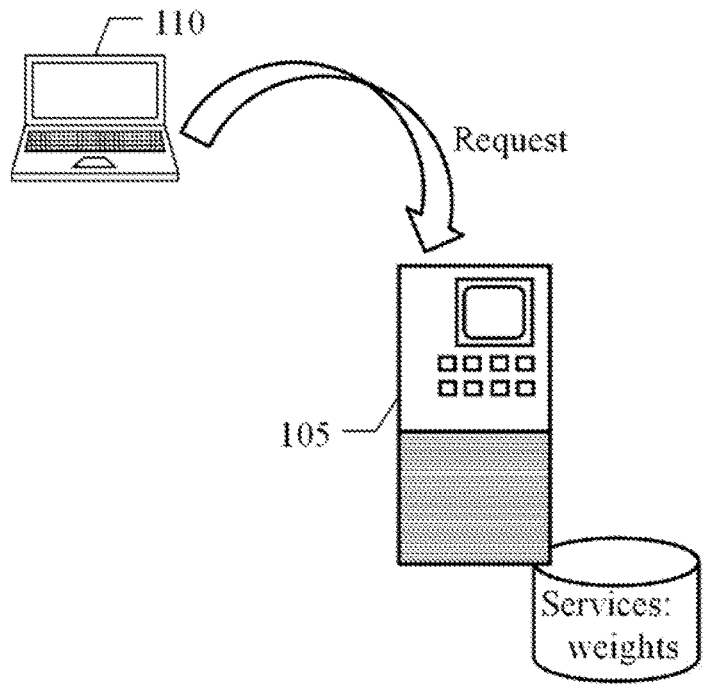
FIGS. 1A, 1B, 1C and 1D show the general principles of the solution according to an embodiment of the present disclosure.

Computing services (hereinafter "services") are generally associated with corresponding policies for controlling their usage; particularly, usage of the computer services may require compliance with specific limitations.

For example, the usage of the services may be subject to a charge by the corresponding cloud providers. Different (charging) schema are available for charging the usage of the services. For example, charging schema of pre-paid type involve the charging of a fixed fee for a maximum amount of usage of the services (such as maximum number of invocations or maximum time of usage thereof) or for their usage without limitations for a maximum period (such as over a day, a week or a month). Alternatively, charging schema of pay-per-use type involve the charging of a variable fee based on the actual usage of the services (such as whenever they are invoked and possibly according to their time of usage).

In addition or in alternative, the usage of the services may be subject to an allowed consumption of the corresponding computing resources (such as processing time, memory occupation and so on). For example, it is possible to limit the services that are invoked concurrently to a maximum number (aimed at guaranteeing acceptable performance of corresponding computing systems where the services are implemented).

In both cases, an effective control of the usage of the services is important to enforce their compliance with the corresponding policies (for example, limiting the usage of the services to their maximum amount or period, metering the usage of the services for their charging and/or restricting the usage of the services to the allowed consumption of the computing resources).

Several techniques are available to facilitate controlling the usage of the services. For example, the usage of each service may be controlled individually at each invocation thereof. For this purpose, each service may by assigned a corresponding value in terms of units; in this way, the usage of the services may be charged/limited differently according to their values. Moreover, it is possible to control the usage of the services with corresponding tokens; each token allows the usage of a corresponding service for a pre-determined period or number of times. In this way, the enforcement of the policies associated with the service may be performed once per token, so that the invocations of the service become faster. The invocations of a same service may also be grouped for multiple users; for this purpose, the service is invoked only once by aggregating all the requests of these users and, vice-versa, a result thereof is disaggregated for the same users (with all of the above that is completely opaque to the computing system implementing the service). In this way, when the invocation of the service has a fixed cost it may be shared among the users (in addition to possible variable costs corresponding to their requests).

However, controlling the usage of the services (and particularly of the compliance thereof to their policies) remain challenging. Particularly, the available techniques are not completely satisfactory in case of heterogeneous services, especially when they are in a high number (such as in cloud environments); indeed, in this case it may be quite difficult to cope with the variety of policies that may be associated with the services.

With reference in particular to FIG. 1A-FIG. 1D, the general principles are shown of the solution according to an embodiment of the present disclosure.

Starting from FIG. 1A, a computing system, for example, a control server 105 controls usage of multiple (computing) services, providing corresponding (computing) functionalities that may be used repeatedly over time for different purposes by different users, such as in a cloud (computing) environment. The services have corresponding usage weights (for example, defined by corresponding numbers of usage units depending on fees to be paid for their usage or on consumption of computing resources by their usage). Whenever the usage of a (new) service is required by any user, a corresponding usage request is submitted to the control server 105 from a computing machine, for example, a client 110 of the user.

Figure 1B:
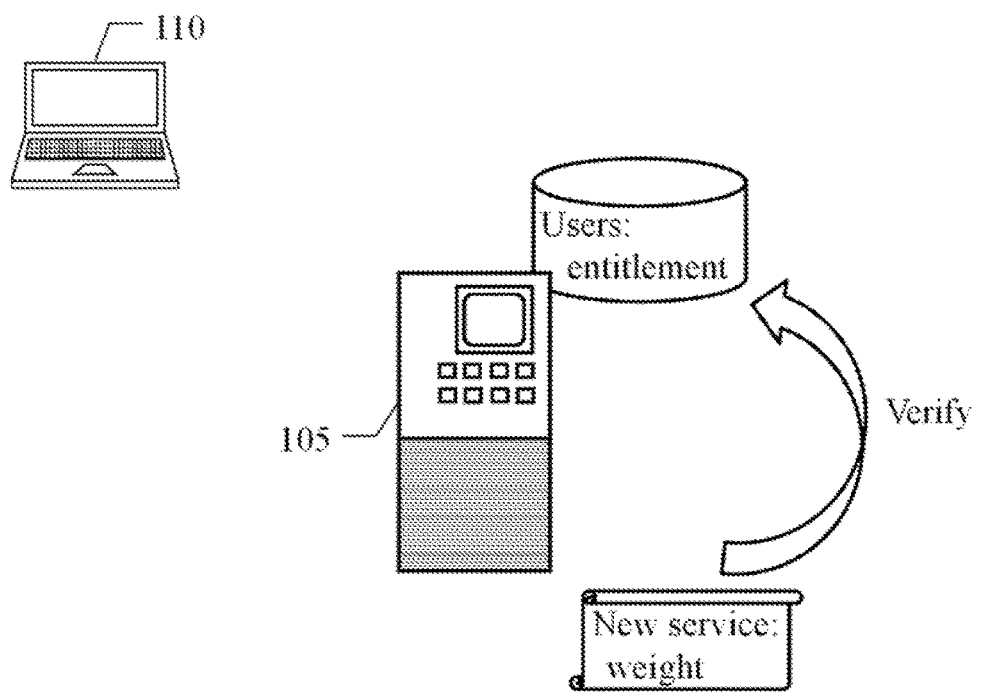

Moving to FIG. 1B, the user is associated with a usage entitlement for the services; the usage entitlement is defined according to usage tokens (for example, each one defined by a number of usage units and having a limited duration). In response to the usage request, the usage weight of the new service is verified against the usage entitlement of the user (for example, by comparing the usage units of the usage entitlement that are still available to the user with the usage units required by the new service).

Figure 1C:
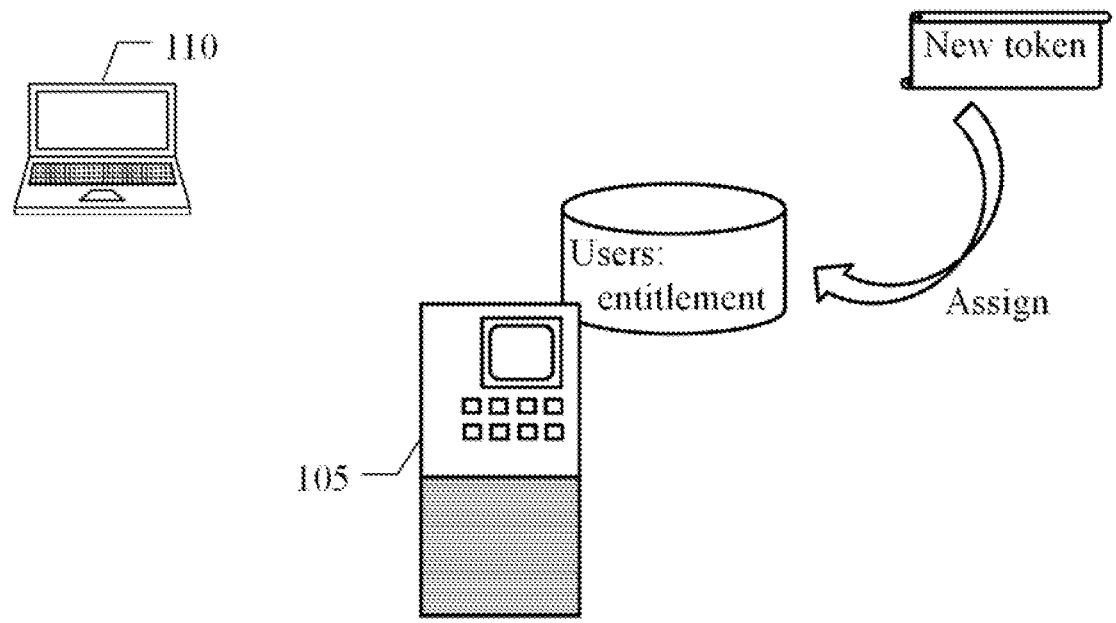

Moving to FIG. 1C, the usage entitlement of the user may be insufficient to meet the usage weight of the new service (for example, because the available usage units of the usage entitlement are lower than the usage units of new service). In this case, a (new) usage token is allocated to the user; the new usage token is adapted to making the usage entitlement of the user sufficient to meet the usage weight of the new service (for example, at least equal to the missing usage units).

Figure 1D:
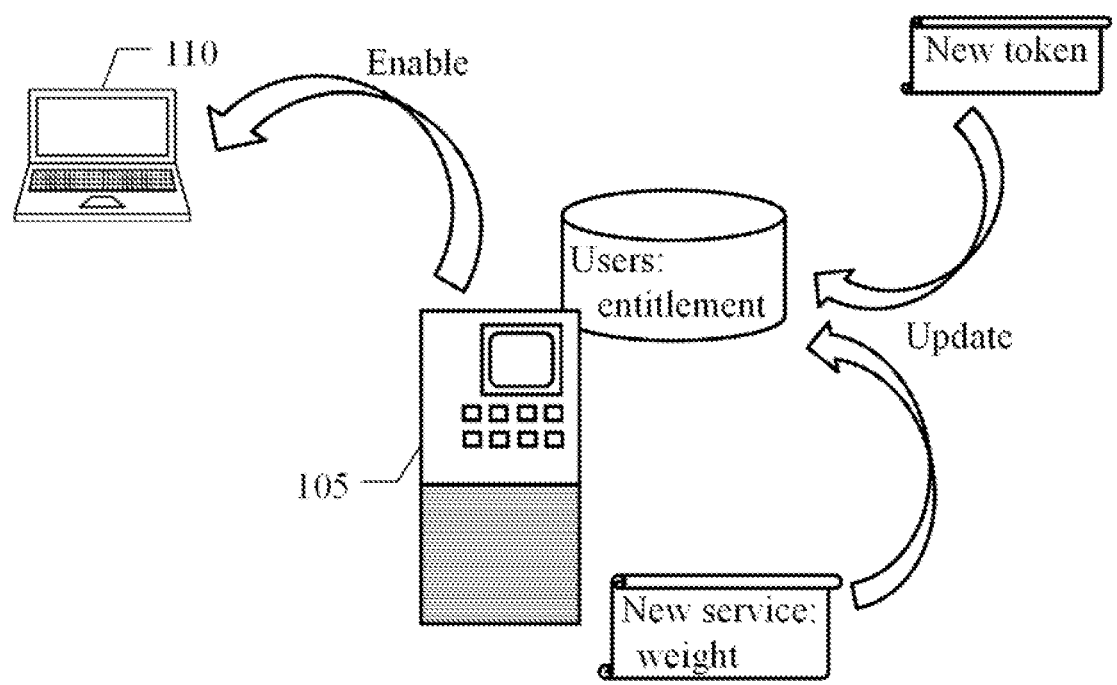

Moving to FIG. 1D, the usage entitlement is updated according to the new usage token and to the usage weight of the new service in response to the allocation of the new usage token (for example, with the usage units of the usage entitlement available to the user that are increased by the usage units of the new usage token and decreased by the usage units of the new service). The usage of the new service by the user is then enabled.

The above-described solution significantly improves control of the usage of the services.

Indeed, each usage token may be used to control the usage of whatever services as a whole (for example, in a number corresponding to its usage units); in this way, the usage of the services is controlled at the level of groups thereof (as defined by the services that may be used according to the usage tokens allocated to the user), instead of at the level of each single service in a way completely unrelated from the other services.

Particularly, the usage tokens facilitate a management of policies associated with the services, such as a control of compliance of their usage with corresponding limitations. For example, the usage of the services may now be charged simply according to the allocation of the usage tokens; likewise, computing resources may now be granted to the services simply with the allocation of the usage tokens. This is completely independent of the services that will be actually used (according to these usage tokens). All of the above makes controlling the usage of the services more efficient and dynamic, with a beneficial effect on expenses (of the users using the services) and/or performance (of the computing systems where the services are implemented), respectively.

This is particularly advantageous in case of heterogeneous services, especially when they are in a high number (such as in cloud environments). Indeed, each usage token may be exploited to enable the usage of any number of services (according to its value; moreover, each usage token may be exploited to enable the usage of services of any types (or of one or more specific types associated therewith).

Figure 2:
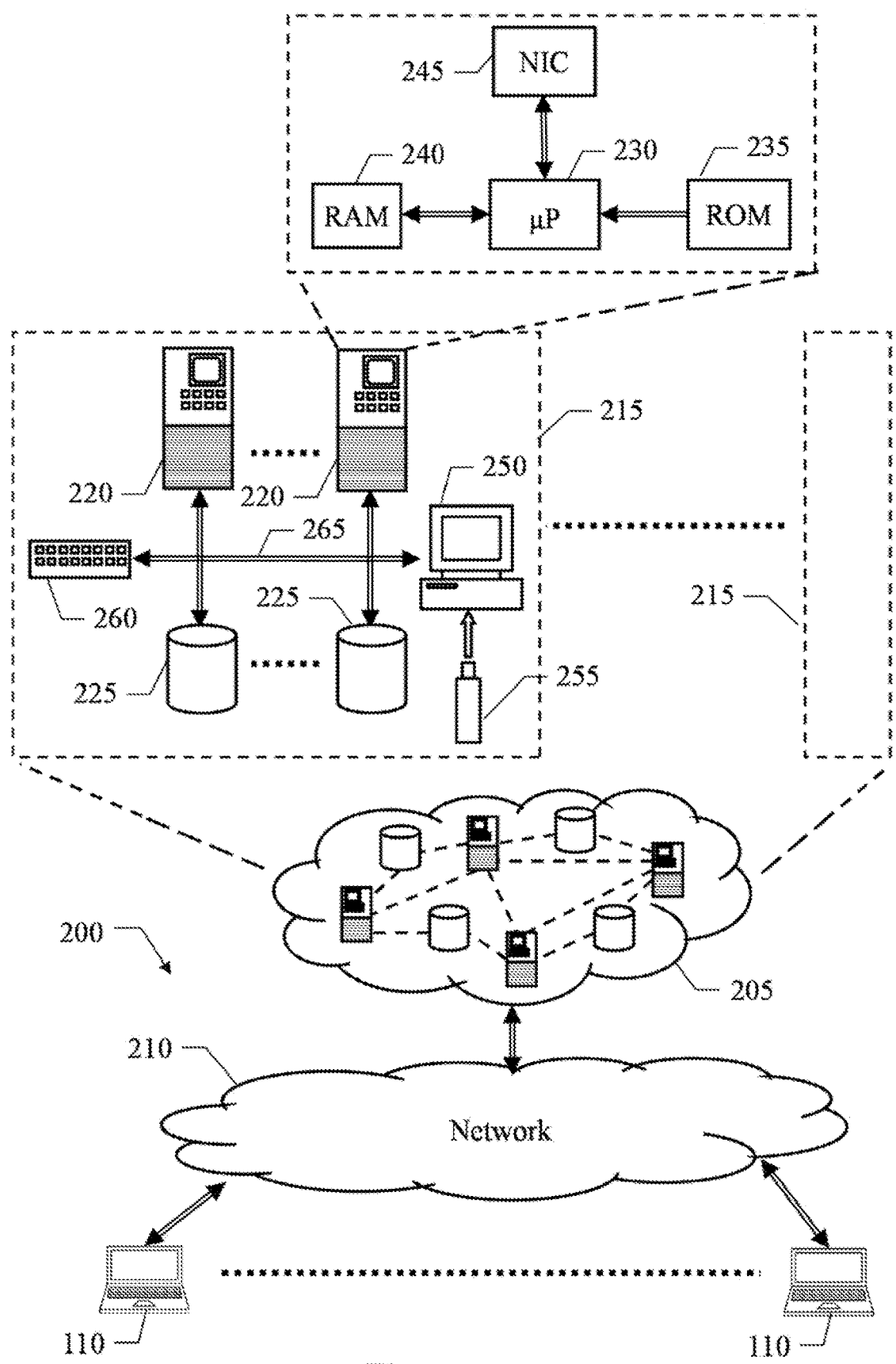
FIG. 2 shows a schematic block diagram of a computing infrastructure wherein the solution according to an embodiment of the present disclosure may be practiced.

With reference now to FIG. 2, a schematic block diagram is shown of a computing infrastructure 200 wherein the solution according to an embodiment of the present disclosure may be practiced.

The computing infrastructure 200 includes one or more cloud providers 205 (only one shown in the figure). Each cloud provider 205 is an entity that provides a pool of (cloud) services, which are implemented by shared computing resources that may be provisioned, configured and released very rapidly; the computing resources (generally of the virtual type, i.e., emulations by software of computing resources of physical type) are allocated upon request to users of the cloud provider 205, so that each user has the sole control of these computing resources (which may then be used exactly as if they were dedicated to the user). The services may be provided according to several service models, particularly, Infrastructure as a Service (IaaS), Platform as a Service (PaaS), Software As a Service (SaaS) and Network as a Service (NaaS). Moreover, the services may be provided according to different deployment models, particularly, public cloud (i.e., for the general public), private cloud (i.e., for a single organization), community cloud (i.e., for several organizations) or hybrid cloud (based on a combination of different deployment models).

The users connect to the cloud provider 205 with corresponding instances of the client 110 (for example, of the thin type) via a (communication) network 210; for example, the network 210 may be the Internet for a public/community cloud or a local area network (LAN) for a private cloud. For this purpose, the cloud provider 205 exposes a front-end component for accessing it (for example, via web browsers of the clients 110); as far as relevant to the present disclosure, this front-end component includes (or interacts with) the above-mentioned control server 105 (not shown in the figure) for controlling the usage of the services, for example, instantiated as a corresponding virtual machine. The front-end component interfaces with a back-end component actually implementing the services on one or more computing systems, for example, service servers instantiated as corresponding virtual machines as well (which back-end component is not accessible from the outside, so that the users are completely agnostic about its location and configuration).

The cloud provider 205 is implemented in one or more server farms 215. Each server farm 215 includes multiple (physical) servers 220 (for example, of the rack or blade type) and multiple storage units 225 (for example, disks of the RAID type) providing mass-memories thereof. In turn, each server 220 includes one or more microprocessors (μP) 230 providing a logic capability of the server 220, a non-volatile memory (ROM) 235 storing basic code for a boot-strap of the server 220, a volatile memory (RAM) 240 used as a working memory by the microprocessors 230 and a network interface card adapter (NIC) 245 for plugging the server 220 into the server farm 215. The server farm 215 also includes a console 250 for controlling it (for example, a personal computer, also provided with a drive for reading/writing removable storage units 255, such as of USB type). A switch/router sub-system 260 manages any communications among the servers 220, the disks or storage units 225 and the console 250, and with the network 210; for this purpose, the servers 220, the storage units 225 and the console 250 are connected to the switch/router sub-system 260 via a cabling sub-system 265.

Figure 3:
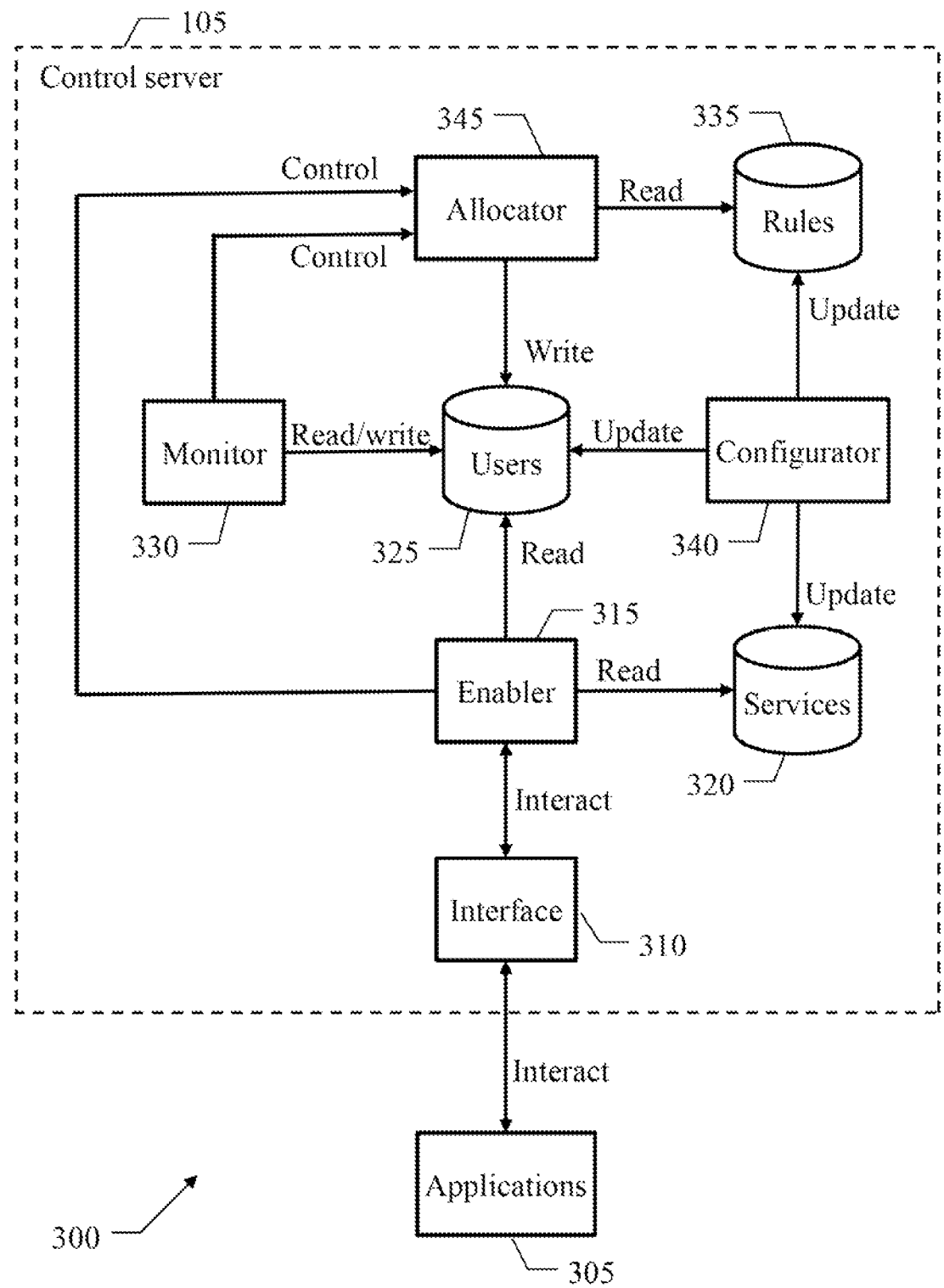
FIG. 3 shows the main software components that may be used to implement the solution according to an embodiment of the present disclosure.

With reference now to FIG. 3, the main software components are shown that may be used to implement the solution according to an embodiment of the present disclosure.

Particularly, all the software components (programs and data) are denoted as a whole with the reference 300 to software components 300. The software components 300 are typically stored in the mass memory and loaded (at least partially) into the working memory of the control/service servers when the programs are running, together with an operating system and other application programs (not shown in the figure). The programs are initially installed into the mass memory, for example, from removable storage units or from the network. In this respect, each program may be a module, segment or portion of code, which includes one or more executable instructions for implementing the specified logical function.

A plurality of software applications 305 implement the services that are offered by the cloud provider on the service servers (not shown in the figure).

Moving to the control server 105, it includes the following components.

A cloud interface 310 allows the users of the cloud provider to use the services (i.e., by invoking them, submitting requests and receiving corresponding responses, and terminating them), for example, via web browsers of their clients (not shown in the figure). For this purpose, the cloud interface 310 interacts with the software applications 305.

A service enabler 315 enables the usage of the services according to an embodiment of the present disclosure. The service enabler 315 interacts with the cloud interface 310; particularly, the cloud interface 310 notifies the service enabler 315 of every invocation of the services and the service enabler 315 controls the cloud interface 310 for enabling the usage of the services.

A service repository 320 defines the services. For example, the service repository 320 stores an entry for each service. The entry includes a type of the service and its usage weight. The type of the service (for example, indicated by a unique identifier thereof) is selected among a set of pre-defined types, each one defined by similar properties of the services belonging thereto; for example, the type may be defined by a nature of the services (such as office suites, computer aided designs (CADs), virtual machines, virtual disks, databases, web servers, virtual private networks (VPNs) and the like), by selected functionalities thereof (such as reading, writing, transmitting, receiving, listening and the like), by a corresponding workload (such as a range of processing power, memory occupation, required bandwidth and the like) and so on. The usage weight measures an impact of the usage of the service on the limitations to be controlled; for example, the usage weight of the service depends on the fees to be paid for its usage, on the computing resources that are expected to be consumed by its usage and so on. The usage weight may be indicated by a number of (dimensionless) usage units (corresponding to a pre-defined fee to be paid and/or a pre-defined amount of computing resources that are consumed).

A user repository 325 defines the users registered with the service provider (for using its services). For example, the user repository 325 stores an entry for each user. The entry includes a token list and, for each of one or more of the possible types of the services, a corresponding allocation counter and usage counter. The token list specifies the (allocated) usage tokens that are currently allocated to the user (if any). For each usage token, the token list indicates one or more types to which the usage token applies, a value of the usage token (expressed by a corresponding number of usage units), a duration of the usage token and its allocation time to the user (which duration and allocation time allow determining an expiration of the usage token). The allocation counter stores the total value of the usage tokens for the corresponding type that are currently allocated to the user (i.e., the sum of their number of usage units), whereas the usage counter stores the total of the usage weights of the services of the corresponding type whose usage is currently enabled to the user (i.e., the sum of their number of usage units). The types of the usage tokens allow controlling the usage of the services at the level of groups for specific types thereof; in addition or in alternative, the durations of the usage tokens allow controlling the usage of the services at the level of specific periods. Both the types and the durations of the usage tokens may be set independently to each other. All of the above adds further flexibility to the solution according to an embodiment of the present disclosure.

The service enabler 315 reads both the service repository 320 and the user repository 325. A token monitor 330 monitors the usage tokens allocated to the users to determine their expiration; for this purpose, the token monitor 330 reads/writes the user repository 325.

An (allocation) rule repository 335 defines one or more allocation rules of the usage tokens. For example, the allocation rules indicate a fee to be charged for each usage unit over a time unit (for the product of the value by the duration of every usage token), a maximum number of usage units of the usage tokens that may be allocated concurrently to each user or group thereof (such as company, department and the like), a maximum amount of the products of the value by the duration of the usage tokens that may be allocated to each user or group thereof every pre-determined period (such as day, week, month and the like), a maximum number of usage units of the usage tokens that may be allocated concurrently to all the users or groups thereof having their services running on a same computing system, and so on.

A configurator 340 exposes a user interface for maintaining the above-mentioned information relating to the services, the users and the allocation rules (for example, by a system administrator of the cloud provider). The configurator 340 updates the service repository 320, the user repository 325 and the rule repository 335.

A token allocator 345 is used to allocate the usage tokens to the users. The token allocator 345 reads the rule repository 335 and writes the user repository 325. Both the service enabler 315 and the token monitor 330 control the token allocator 345.

Figure 4A:
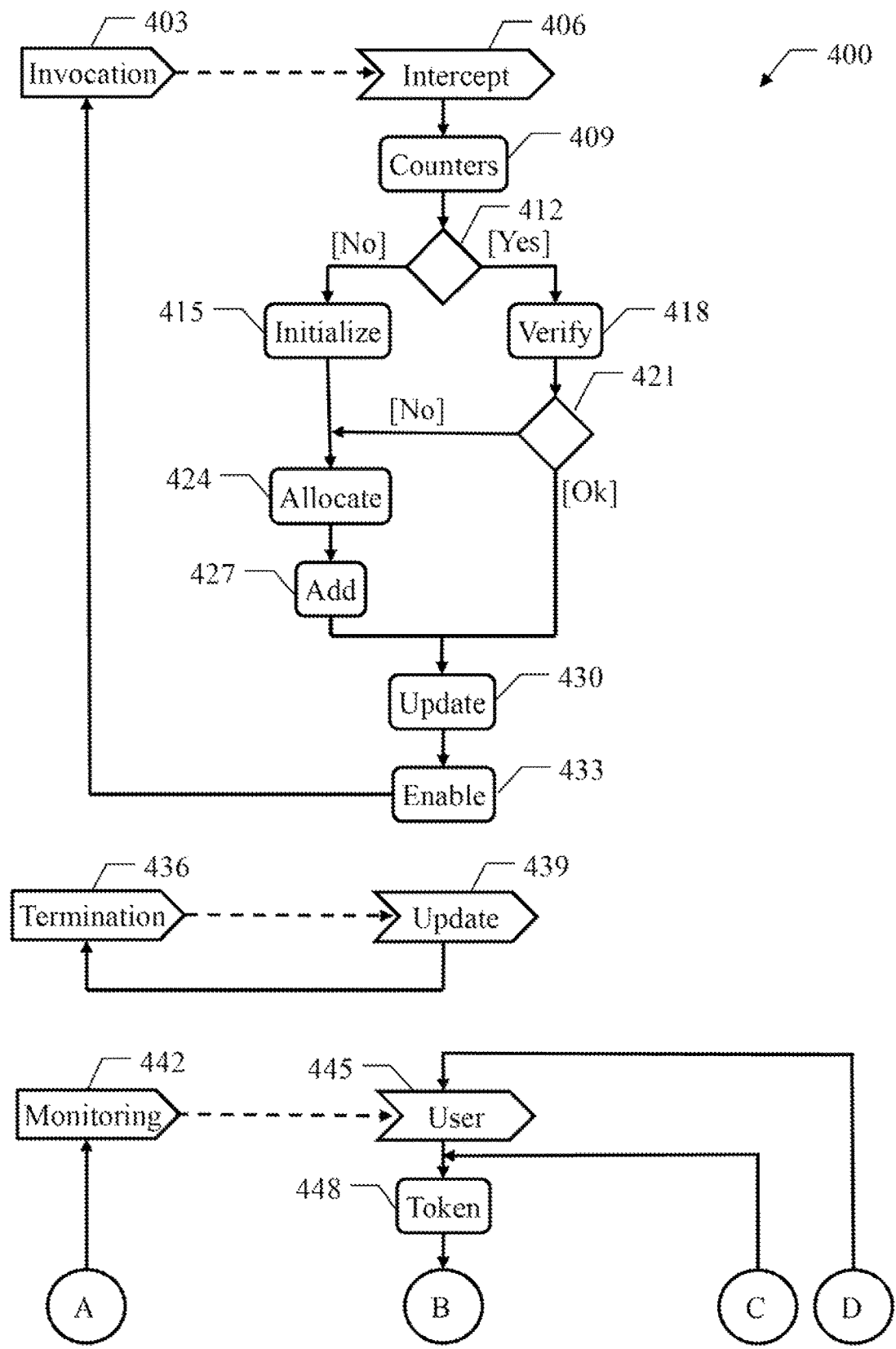
FIGS. 4A and 4B show an activity diagram describing the flow of activities relating to an implementation of the solution according to an embodiment of the present disclosure.
Figure 4B:
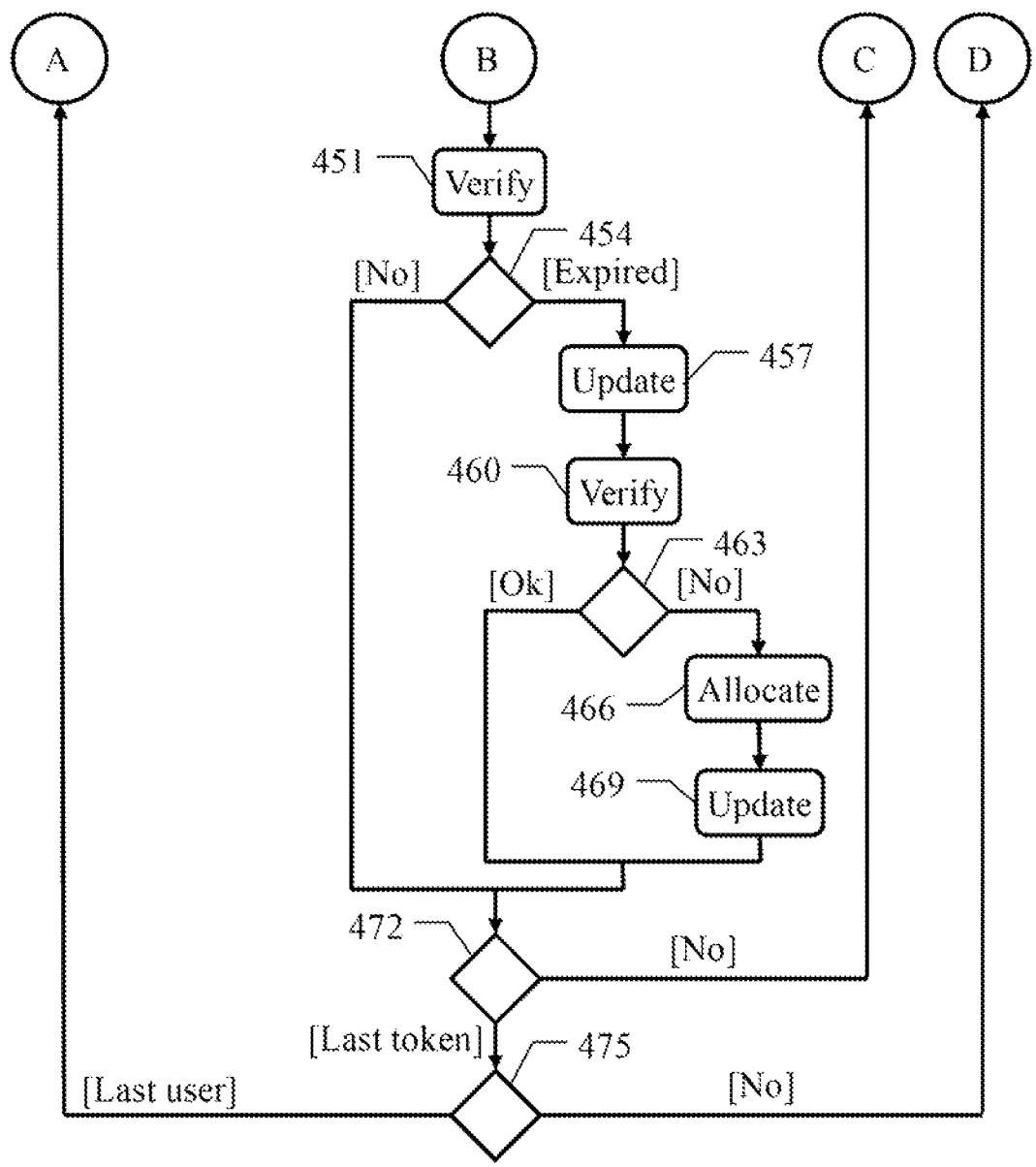

With reference now to FIGS. 4A and 4B, an activity diagram is shown describing the flow of activities relating to an implementation of the solution according to an embodiment of the present disclosure.

In this respect, each block may correspond to one or more executable instructions for implementing the specified logical function on the control server. Particularly, the diagram represents an exemplary process that may be used to control the usage of multiples services (offered by the cloud provider in the example at issue) with a method 400.

The process passes from block 403 to block 406 when the cloud interface receives an (invocation) command (block 403) for invoking a (new) service for a user from a browser of a corresponding client (for example, after the user has authenticated with the cloud provider with his/her userid and password). The cloud interface intercepts (block 406) the invocation command and passes it to the service enabler. In response thereto, the service enabler at block 409 verifies whether the allocation counter and the usage counter for the type of the new service (retrieved from the corresponding repository) are present in the record of the user in the corresponding repository.

The flow of activity branches at block 412 according to a result of this verification. If the availability/usage counters for the type of the new service do not exist for the user, block 409 follows the "no" branch to block 415. This is the first time the user requests usage of services of this type and the service enabler at block 415 adds the allocation counter and the usage counter for the type of the new service to the record of the user in the corresponding repository, and initializes both the allocation counter and the usage counter to 0.

Conversely, if the availability/usage counters for the type of the new service already exist for the user, block 409 follows the "yes" branch to block 418. This means the user has already requested the usage of services of this type, and the service enabler at block 418 verifies whether the usage entitlement of the user for the type of the new service (defined by the corresponding availability/usage counters) is sufficient to meet its usage weight (retrieved from the service repository); for this purpose, the service enabler calculates a difference between the allocation counter and the usage counter (defining an availability counter of the user for the type of the new service, which represents the usage units of the usage tokens for this type that are still available to the user) and compares it with the usage weight of the new service. The flow of activity branches at block 421 according to a result of this verification.

If the availability counter is strictly lower than the usage weight of the new service (meaning that the result of the verification is negative) the process follows the "no" branch and continues to block 424; the same point is also reached directly from the block 415 (since this is always true for the availability counter equal to 0). The token allocator then allocates a (new) usage token to the user at block 424. The new usage token is adapted to making the usage entitlement of the user sufficient to meet the usage weight of the new service. For this purpose, the new usage token applies to the type of the new service, has a value at least equal to a difference between the availability counter and the usage weight of the new service and a desired duration. The value and the duration of the new usage token are set according to an expected usage of the services of this type by the user (in terms of their usage weights and usage times, respectively), for example, equal to them or to a pre-defined multiple thereof (such as 1.5-2 times); the expected usage is estimated automatically according to corresponding historical information (logged into a corresponding repository over time). This operation is driven by the applicable allocation rules (retrieved from the corresponding repository); for example, the allocations rules cause the charging of the user for the new usage token, constraint the value and/or the duration of the new usage token according to corresponding limits and so on.

Next, the token allocator at block 427 updates the record of the user in the corresponding repository accordingly. Particularly, the token allocator adds the new usage token to the token list, with its type, value, duration and allocation time (set to a current time); moreover, the token allocator increments the allocation counter for the type of the new usage token by its value.

The process then descends into block 430; the same point is also reached directly from the block 421 following the "ok" branch, when the availability counter is equal to or higher than the usage weight of the new service (meaning that the usage entitlement of the user is sufficient to meet the usage weight of the new service). At this point, the service enabler updates the usage counter for the type of the new service at block 430, incrementing it by the usage weight thereof.

Then service enabler at block 433 commands the cloud interface to enable the usage of the new service. As a consequence, the cloud interface submits the invocation command to the software application implementing the new service to start it; from now on, the cloud interface forwards every requests submitted by the client of the user to the software application and returns every corresponding response generated by the software application to the client of the user. The process then goes back to the block 403 waiting for the invocation of a further new service.

In a completely independent way, the process passes from block 436 to block 439 whenever the cloud interface receives a (termination) command for terminating the usage of an (old) service of the (enabled) services whose usage is currently enabled to the user. In response thereto, the service enabler updates the record of the user in the corresponding repository accordingly; particularly, the service enabler decrements the usage counter for the type of the old service by the usage weight of the old service (retrieved from the service repository). The process then goes back to the block 436 waiting for a termination of a further old service.

At the same time, a loop is performed continually for monitoring the (allocated) usage tokens that are currently allocated to the users. Particularly, the process passes from block 442 to block 445 as soon as a monitoring period expires (for example, every 1-10 seconds). In response thereto, the token monitor takes a (current) user into account (starting from a first one in any arbitrary order), by retrieving its record from the corresponding repository. The token monitor at block 448 then takes a (current) usage token of the user into account (starting from a first one in any arbitrary order), by retrieving the corresponding information from the token list in the record of the user. The token monitor at block 451 verifies whether the usage token has expired; for this purpose, the token monitor compares an elapsed time from the allocation of the usage token (given by the difference between a current time and the allocation time of the usage token) with its duration.

The flow of activity branches at block 454 according to a result of this verification. If the elapsed time is equal to or higher than the duration of the usage token (meaning that it has expired), following the flow "expired", the token monitor at block 457 updates the record of the user accordingly in the corresponding repository. Particularly, the token monitor decrements the allocation counter for the type of the (expired) usage token by its value; moreover, the token monitor removes the expired usage token from the token list.

Then the service enabler at block 460 now verifies whether the usage entitlement of the user for the type of the expired usage token is still sufficient to meet the usage weights of the enabled services of the user; for this purpose, the service enabler compares the allocation counter and the usage counter of the type of the expired usage token.

Next, the flow of activity branches at block 463 according to a result of this verification. If the allocation counter is strictly lower than the usage counter (meaning that the result of the verification is negative), following the flow "no", the token allocator at block 466 allocates a (further) new usage token to the user. The new usage token is adapted to making the usage entitlement again sufficient to meet the usage weights of the enabled services of the type of the expired usage token. For this purpose, the new usage token applies to the type of the expired usage token, has a value at least equal to a difference between the corresponding allocation counter and usage counter and a desired duration. The value and the duration of the new usage token are set according to an expected usage of the services of this type by the user as above. In this case as well, the operation is driven by the applicable allocation rules (retrieved from the corresponding repository).

Then, the token allocator at block 469 updates the record of the user in the corresponding repository accordingly. Particularly, the token allocator adds the new usage token to the token list, with its type, value, duration and allocation time (set to the current time); moreover, the token allocator increments the allocation counter for the type of the new usage token by its value.

The process then descends into block 472; the same point is also reached directly from the block 454 (when the elapsed time is strictly lower than the duration of the usage token, meaning that it has not expired yet) following the "no" flow, or from the block 463 (when the allocation counter is equal to or higher than the usage counter for the type of the expired usage token, meaning that the usage entitlement of the user is still sufficient to meet the usage weights of the allocated services of this type), from the "ok" flow.

At block 472, the token monitor now verifies whether a last usage token of the user has been processed. If not, following the "no" flow, the flow of activity returns to the block 448 to repeat the same operations on a next usage token of the user. Conversely (once all the usage tokens of the users have been processed), following the "last token" flow, the process descends into block 475.

At block 475, the token monitor now verifies whether a last user has been processed. If not, following the "no" flow, the flow of activity returns to the block 445 to repeat the same operations on a next user. Conversely (once all the users have been processed), following the "last user" flow, the process goes back to the block 442 waiting for a next expiration of the monitoring period.

Figure 5:
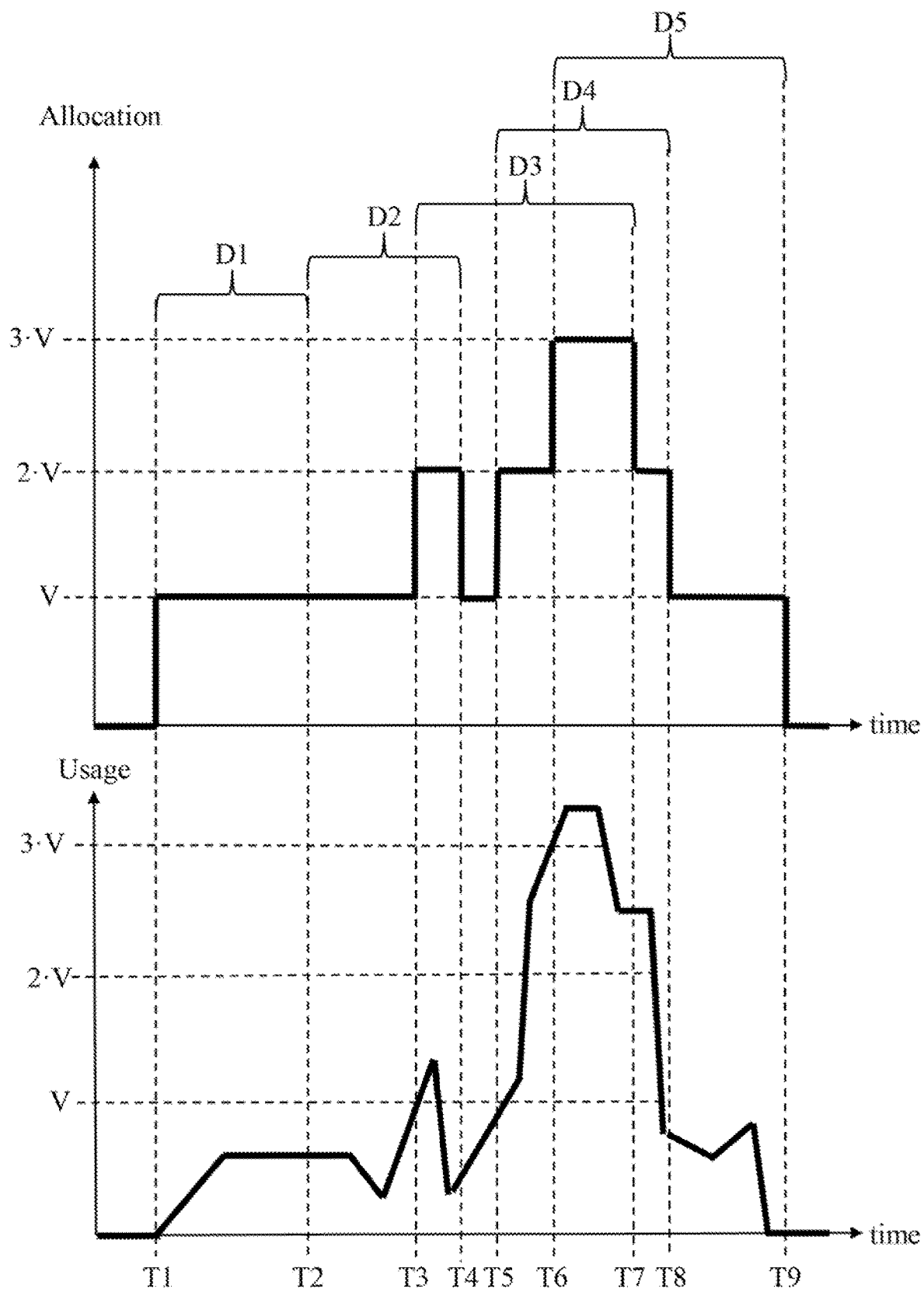
FIG. 5 shows an exemplary application of the solution according to an embodiment of the present disclosure.

With reference now to FIG. 5, an exemplary application is shown of the solution according to an embodiment of the present disclosure.

Particularly, a very simple case is considered of the usage of services of a single type by a user based on corresponding usage tokens all having a same value V. The dynamic change of the usage entitlement of the user is depicted by two diagrams plotting the usage counter and the allocation counter, respectively (on the ordinate axis) against the time (on the abscissa axis), all of them in arbitrary units.

The user starts requesting the usage of the services at a time T1; the usage counter is then updated accordingly over time, by increasing it when the usage of (new) services is enabled and decreasing it when the usage of (old) services is terminated. As a consequence, a first usage token having a duration D1 is allocated to the user, so that its allocation counter becomes V. In this period, the usage counter remains below V (lower than the allocation counter).

At a time T2 the first usage token expires, so that the allocation counter would become 0 (lower than the usage counter). Therefore, a second usage token having a duration D2 is allocated to the user, so that its allocation counter remains V (still higher than the usage counter).

The usage counter remains below V up to a time T3 (when the usage of a new service is requested that would make the usage counter higher than the allocation counter). Therefore, a third usage token having a duration D3 is allocated to the user, so that its allocation counter becomes 2·V (thereby enabling the usage of the new service).

At a time T4 the second usage token expires, so that the allocation counter becomes V; however, meanwhile the usage counter has fallen below V (still lower than the allocation counter).

The usage counter remains below V up to a time T5 (when the usage of a new service is requested that would make the usage counter higher than the allocation counter). Therefore, a fourth usage token having a duration D4 is allocated to the user, so that its allocation counter becomes 2·V (thereby enabling the usage of the new service).

The usage counter remains below 2·V up to a time T6 (when the usage of a new service is requested that would make the usage counter higher than the allocation counter). Therefore, a fifth usage token having a duration D5 is allocated to the user, so that its allocation counter becomes 3·V (thereby enabling the usage of the new service).

At a time T7 the third usage token expires, so that the allocation counter becomes 2·V; however, meanwhile the usage counter has fallen below 2·V (still lower than the allocation counter).

At a time T8 the fourth usage token expires, so that the allocation counter becomes V; however, meanwhile the usage counter has fallen below V (still lower than the allocation counter).

At a time T9 the fifth usage token expires, so that the allocation counter becomes 0; however, meanwhile the usage counter has fallen to 0 as well (since the user has ended using the computing services).

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may be practiced even without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (including its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/a should be intended as one or more items (unless expressly indicated otherwise), and the term means for (or any means-plus-function formulation) should be intended as any structure adapted or configured for carrying out the relevant function.

For example, an embodiment provides a method for controlling usage of computing services. However, the computing services may be in any number and of any type, in the broadest meaning of the term (for example, providing application, system, communication and the like functionalities, implemented on any number and type of computing systems, such as in a cloud environment, in a client/server environment, on remote/local machines and the like, and so on).

In an embodiment, the computing services are associated with corresponding usage weights. However, the usage weights may be of any type (for example, defined in any way, such as by usage units, continuous values and the like, with any meaning, such as fees to be paid, computing resources being consumed and the like, and so on) and they may be associated with computing services in any way (for example, in a local/remote repository, indicated in the corresponding usage requests and so on).

In an embodiment, the method includes the following steps under the control of a computing system. However, the computing system may be of any type (see below).

In an embodiment, the method includes receiving (by the computing system) a usage request for usage of a new one of the computing services by a user. However, the usage request may be of any type (for example, an invocation, a command, an access and so on) and it may be received in any way (for example, remotely, locally, from any client such as a laptop, a smartphone, a tablet and the like, forwarded, intercepted and so on) for any user (for example, a person, a group of persons, such as a department, an organization and the like, a software application, another service and so on).

In an embodiment, the user is associated with a usage entitlement of the computing services defined according to usage tokens. However, the usage entitlement may be of any type (for example, one or more pairs of allocation counter and usage counter, one or more availability counters, a list of allocated usage tokens and a list of enabled computing services, differentiated for types of computing services or generic, and so on) and it may be associated with the user in any way (for example, locally, remotely and so on); moreover, the usage tokens may be of any type (for example, specific for types of computing services or generic, defined by any value, with or without a limited duration and so on).

In an embodiment, the method includes allocating (by the computing system) a new one of the usage tokens to the user in response to the usage entitlement being insufficient to meet the usage weight of the new computing service. However, this condition may be detected in any way (for example, when a difference between the corresponding allocation counter and usage counter is lower than the usage weight, when the corresponding availability counter is lower than the usage weight and so on); the new usage token may be allocated in any way in response to this condition (for example, automatically, upon a manual confirmation and so on).

In an embodiment, the new usage token is adapted to making the usage entitlement sufficient to meet the usage weight of the new computing service. However, the new usage token may be configured for this purpose in any way (for example, with a value and/or a duration corresponding to an estimated behavior of the user, set to a minimum being required, selected manually and so on).

In an embodiment, the method includes updating (by the computing system) the usage entitlement according to the new usage token and to the usage weight of the new computing service in response to the allocating the new usage token. However, the usage entitlement may be updated in any way according to the new usage token (for example, by increasing both the allocation counter and the usage counter, by updating the availability counter and so on).

In an embodiment, the method includes enabling (by the computing system) the usage of the new computing service by the user in response to the updating the usage entitlement. However, the usage of the new computing service may be enabled in any way (for example, by sending a corresponding notification, forwarding the usage request and so on).

Further embodiments provide additional advantageous features, which may however be omitted at all in a basic implementation.

Particularly, in an embodiment the method includes receiving (by a computing system) a termination request for terminating the usage of an old one of the computing services (among enabled one or more of the computing services whose usage is currently enabled to the user). However, the termination request may be of any type (for example, a command, a closure, a disconnection and so on) and it may be received in any way (either the same or different with respect to the usage request).

In an embodiment, the method includes updating (by the computing system) the usage entitlement according to the usage weight of the old computing service in response to the termination request therefor. However, the usage entitlement may be updated in any way according to this event (for example, by decreasing the usage counter, by increasing the availability counter and so on); in any case, the possibility is not excluded of having the usage entitlement independent of the termination of the usage of the computing services.

In an embodiment, the usage tokens have corresponding durations. However, the durations may have any value (for example, specific of each usage token, common for all the usage tokens or groups thereof, and so on).

In an embodiment, the method includes detecting (by the computing system) an expiration of an expired one of the usage tokens whose duration has expired (among allocated one or more of the usage tokens currently allocated to the user). However, the expiration of the usage token may be detected in any way (for example, by monitoring the time elapsed from the allocation of the usage token, by receiving a notification from a counter being set according to the duration of the usage token at its allocation and so on).

In an embodiment, the method includes updating (by the computing system) the usage entitlement according to the expired usage token in response to the expiration thereof. However, the usage entitlement may be updated in any way according to this event (for example, by decreasing the allocation counter, decreasing the availability counter and so on); in any case, the possibility is not excluded of obtaining the same result by releasing the usage tokens actively (for example, as soon as they are not necessary any longer, in response to a corresponding manual command and so on).

In an embodiment, the method includes allocating (by the computing system) a further new one of the usage tokens to the user in response to the entitlement becoming insufficient to meet the usage weights of enabled one or more of the computing services (whose usage is currently enabled to the user) as a consequence of the expiration of the expired usage token. However, the further new usage token may be allocated in any way in response to this event (either the same or different with respect to the allocation of the new usage token).

In an embodiment, the further usage token is adapted to making the usage entitlement sufficient to meet the usage weights of the enabled computing services. However, the further new usage token may be configured for this purpose in any way (for example, with a value and/or a duration corresponding to an estimated behavior of the user, set to a minimum being required, selected manually, the same as the expired usage token and so on).

In an embodiment, the method includes updating (by the computing system) the usage entitlement according to the further new usage token. However, the usage entitlement may be updated in any way according to the further new usage token (either the same or different with respect to the new usage token).

In an embodiment, each of the computing services belongs to one of a plurality of service types. However, the service types may be in any number and defined in any way (for example, partial, different and additional service types with respect to the ones mentioned above).

In an embodiment, each of the usage tokens is associated with one or more of the service types. However, each usage token may be associated with any number of service types (for example, disjoint, overlapped and so on).

In an embodiment, the method includes allocating (by the computing system) the new usage token of the service type of the new computing service to the user in response to the usage entitlement being insufficient to meet the usage weight of the new computing service for the service type thereof. However, the usage entitlement may be defined in any way for the different service types (for example, with a pair of allocation counter and usage counter for each service type, an availability counter for each service type, the list of allocated usage tokens and the list of enabled computing services, the list of allocated usage tokens each one with an associated value of its consumption by the enabled computing services of the corresponding service type, and so on) and then updated accordingly in response to this condition (for example, when more usage tokens are allocated for the service type of the new computing service, it is possible to give precedence for their consumption in increasing order of number of associated service types, in decreasing order of values still available, in decreasing order of remaining durations and so on).

In an embodiment, the method includes setting (by the computing system) the new usage token according to an expected usage of the computing services by the user. However, the expected usage may be determined in any way (for example, from historical information, typical patterns, globally or individually for each service type, and so on) and the new usage token may be set according thereto in any way (for example, calculated with partial, different and additional formulas with respect to the ones mentioned above).

In an embodiment, the method includes estimating (by the computing system) the expected usage of the computing services according to corresponding historical information. However, this result may be obtained in any way (for example, with statistical models, neural networks, according to historical information relating to any period of time and so on).

In an embodiment, the usage weights, the usage entitlement and corresponding values of the usage tokens are defined by corresponding numbers of usage units. However, the usage units may have any meaning (for example, fees, computing resources and so on).

In an embodiment, the method includes allocating (by the computing system) the new usage token to the user in response to the usage entitlement being strictly lower than the usage weight of the new computing service (the value of the new usage token being at least equal to a difference between the usage weight of the new computing service and the usage entitlement). However, this condition may be detected in any way (for example, according to a difference between the corresponding allocation counter and usage counter, to the corresponding availability counter and so on).

In an embodiment, the method includes incrementing (by the computing system) the usage entitlement by a difference between the value of the new usage token and the usage weight of the new computing service in response to the allocating the new usage token. However, the usage entitlement may be incremented in any way according to the new usage token (for example, by increasing both the allocation counter and the usage counter, by updating the availability counter and so on).

In an embodiment, the computing services are cloud services. However, the cloud services may be of any type (for example, partial, different and additional cloud services with respect to the ones mentioned above, either individually or in any combination thereof).

In an embodiment, the method includes charging (by the computing system) the user according to the usage tokens allocated thereto. However, the user may be charged in any way (for example, individually, at the level of department, organization and so on).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a computing system to perform the above-mentioned method. An embodiment provides a computer program product, which includes one or more computer readable storage media that have program instructions collectively stored thereon; the program instructions are readable by a computing system to cause the computing system to perform the same method. However, the computer program may be implemented as a stand-alone module, as a plug-in for a pre-existing software application (for example, a control module of the cloud provider) or directly therein. Moreover, the computer program may be executed on any computing system (see below). In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system including means that are configured for performing the steps of the above-described method. An embodiment provides a system including a circuit (i.e., any hardware suitably configured, for example, by software) for performing each step of the above-described method. However, the system may include any number and type of computing machines (for example, of physical and/or virtual type) and it may have any architecture (implemented in a cloud environment or in a distributed environment with the computing machines communicating among them via any network, stand-alone, and so on).

Generally, similar considerations apply if the system has a different structure or includes equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

Figure 6:
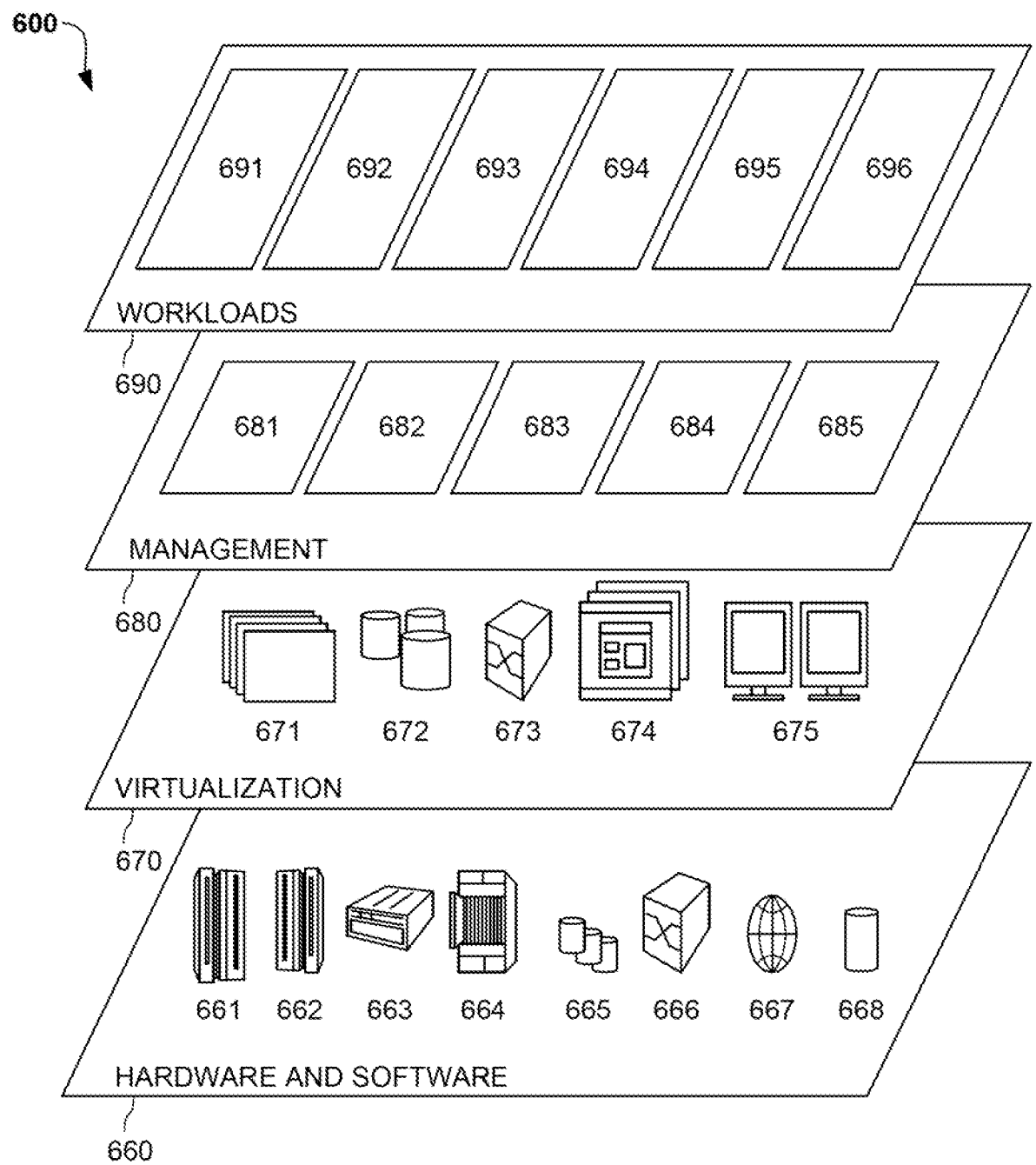
FIG. 6 shows abstraction model layers according to an embodiment of the present disclosure.

With reference now to FIG. 6, a set of functional abstraction layers provided by network 210 (as shown in FIG. 2) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672, for example the storage unit 225 as shown in FIG. 2; virtual networks 673, including virtual private networks; virtual applications and operating systems 674; and virtual clients 675.

In an example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and computing services usage program 696. The computing services usage program 696 may control usagage of computing services for users of the computing services.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for controlling usage of computing services, the method comprising:
    defining a set of computing services and a corresponding usage weight for each computing service of the set of computing services, wherein the usage weights correspond to processing power, memory occupation and required bandwidth for use of the corresponding computing service;
    assigning each computing service of the set of computing services to a service type, wherein the service type is selected among a set of pre-defined service types defined by similar properties and usage weights, wherein the pre-defined service types comprise office suites, computer aided design, virtual machines, virtual disks, databases, web servers and virtual private networks;
    defining a first group of users;
    assigning a first usage entitlement to the first group of users, wherein the first usage entitlement comprises a first set of usage tokens, wherein each usage token of the first set of usage tokens comprises a service type, a service duration and an available usage weight corresponding to each service type;
    receiving a first usage request for a first service of the computing services by a first user of the first group of users;

identifying the service type corresponding to the first service;

in response to determining the assigned first usage entitlement for the identified service type of the first group of users is insufficient to meet a usage service duration and the usage weight of the identified service type, allocating an additional first usage entitlement to meet the usage service duration and the usage weight of the identified service type, to the first group of users for the identified service type; and enabling usage of the first service by the first user in response to the allocation of the additional usage entitlement.

2. The method according to claim 1, further comprising:
receiving a termination request for terminating the usage of first service; and
updating the usage entitlement of the first group of users of the first service in response to the termination request.

3. The method according to claim 1, further comprising:
detecting an expiration of a duration of a first usage token of the first set of usage tokens; and
updating a corresponding usage entitlement.

4. The method according to claim 1, wherein the computing services are cloud services.

5. The method according to claim 1, further comprising:
charging the first group of users according to the allocation of the additional usage entitlement.

6. The method according to claim 1, further comprising:
defining a second group of users;
assigning a second usage entitlement to the second group of users, wherein the second usage entitlement comprises a second set of usage tokens, wherein each usage token of the second set of usage tokens comprises a service type, a service duration and an available usage weight corresponding to each service type;
receiving a second usage request for a second service of the computing services by a second user of the second group of users;
identifying the service type corresponding to the second service;
in response to determining the assigned second usage entitlement for the identified service type of the second group of users is insufficient to meet a usage service duration and the usage weight of the identified service type, allocating an additional second usage entitlement to meet the usage service duration and the usage weight of the identified service type, to the second group of users for the identified service type; and
enabling usage of the second service by the second user in response to the allocation of the additional usage entitlement.

7. A computer program product for controlling usage of computing services, the computing services are associated with corresponding usage weights, the computer program product comprising:
one or more computer-readable tangible storage medium and program instructions stored on at least one of the one or more tangible storage medium, the program instructions executable by a processor, the program instructions the program instructions readable by a computing system to cause the computing system to perform a method comprising:
defining a set of computing services and a corresponding usage weight for each computing service of the set of computing services, wherein the usage weights correspond to processing power, memory occupation and required bandwidth for use of the corresponding computing service;
assigning each computing service of the set of computing services to a service type, wherein the service type is selected among a set of pre-defined service types defined by similar properties and usage weights, wherein the pre-defined service types comprise office suites, computer aided design, virtual machines, virtual disks, databases, web servers and virtual private networks;
defining a first group of users;
assigning a first usage entitlement to the first group of users, wherein the first usage entitlement comprises a first set of usage tokens, wherein each usage token of the first set of usage tokens comprises a service type, a service duration and an available usage weight corresponding to each service type;
receiving a first usage request for a first service of the computing services by a first user of the first group of users;
identifying the service type corresponding to the first service;
in response to determining the assigned first usage entitlement for the identified service type of the first group of users is insufficient to meet a usage service duration and the usage weight of the identified service type, allocating an additional first usage entitlement to meet the usage service duration and the usage weight of the identified service type, to the first group of users for the identified service type; and
enabling usage of the first service by the first user in response to the allocation of the additional usage entitlement.

8. The computer program product according to claim 7, further comprising:
receiving a termination request for terminating the usage of first service; and
updating the usage entitlement of the first group of users of the first service in response to the termination request.

9. The computer program product according to claim 7, further comprising:
detecting an expiration of a duration of a first usage token of the first set of usage tokens; and
updating a corresponding usage entitlement.

10. The computer program product according to claim 7, wherein the computing services are cloud services.

11. The computer program product according to claim 7, further comprising:
charging the first group of users according to the allocation of the additional usage entitlement.

12. The computer program product according to claim 7, further comprising:
defining a second group of users;
assigning a second usage entitlement to the second group of users, wherein the second usage entitlement comprises a second set of usage tokens, wherein each usage token of the second set of usage tokens comprises a service type, a service duration and an available usage weight corresponding to each service type;
receiving a second usage request for a second service of the computing services by a second user of the second group of users;
identifying the service type corresponding to the second service;

in response to determining the assigned second usage entitlement for the identified service type of the second group of users is insufficient to meet a usage service duration and the usage weight of the identified service type, allocating an additional second usage entitlement to meet the usage service duration and the usage weight of the identified service type, to the second group of users for the identified service type; and enabling usage of the second service by the second user in response to the allocation of the additional usage entitlement.

13. A computer system for controlling usage of computing services, the computing services being associated with corresponding usage weights, wherein the computer system comprises:

one or more computer processors, one or more computer-readable storage media, and program instructions stored on the one or more of the computer-readable storage media for execution by at least one of the one or more processors, wherein the computer system is capable of performing a method comprising:

defining a set of computing services and a corresponding usage weight for each computing service of the set of computing services, wherein the usage weights correspond to processing power, memory occupation and required bandwidth for use of the corresponding computing service;

assigning each computing service of the set of computing services to a service type, wherein the service type is selected among a set of pre-defined service types defined by similar properties and usage weights, wherein the pre-defined service types comprise office suites, computer aided design, virtual machines, virtual disks, databases, web servers and virtual private networks;

defining a first group of users;

assigning a first usage entitlement to the first group of users, wherein the first usage entitlement comprises a first set of usage tokens, wherein each usage token of the first set of usage tokens comprises a service type, a service duration and an available usage weight corresponding to each service type;

receiving a first usage request for a first service of the computing services by a first user of the first group of users;

identifying the service type corresponding to the first service;

in response to determining the assigned first usage entitlement for the identified service type of the first group of users is insufficient to meet a usage service duration and the usage weight of the identified service type, allocating an additional first usage entitlement to meet the usage service duration and the usage weight of the identified service type, to the first group of users for the identified service type; and enabling usage of the first service by the first user in response to the allocation of the additional usage entitlement.

14. The computer system according to claim 13, further comprising:

receiving a termination request for terminating the usage of first service; and updating the usage entitlement of the first group of users of the first service in response to the termination request\.

15. The computer system according to claim 13, further comprising:

detecting an expiration of a duration of a first usage token of the first set of usage tokens; and updating a corresponding usage entitlement.

16. The computer system according to claim 13, wherein the computing services are cloud services.

17. The computer system according to claim 13, further comprising:

charging the first group of users according to the allocation of the additional usage entitlement.

18. The computer system according to claim 13, further comprising:

defining a second group of users;

assigning a second usage entitlement to the second group of users, wherein the second usage entitlement comprises a second set of usage tokens, wherein each usage token of the second set of usage tokens comprises a service type, a service duration and an available usage weight corresponding to each service type;

receiving a second usage request for a second service of the computing services by a second user of the second group of users;

identifying the service type corresponding to the second service;

in response to determining the assigned second usage entitlement for the identified service type of the second group of users is insufficient to meet a usage service duration and the usage weight of the identified service type, allocating an additional second usage entitlement to meet the usage service duration and the usage weight of the identified service type, to the second group of users for the identified service type; and enabling usage of the second service by the second user in response to the allocation of the additional usage entitlement.

* * * * *